March 14, 1961  J. A. LINDSAY  2,974,717
HEAT SEALING TOOL
Filed June 21, 1960  2 Sheets-Sheet 2
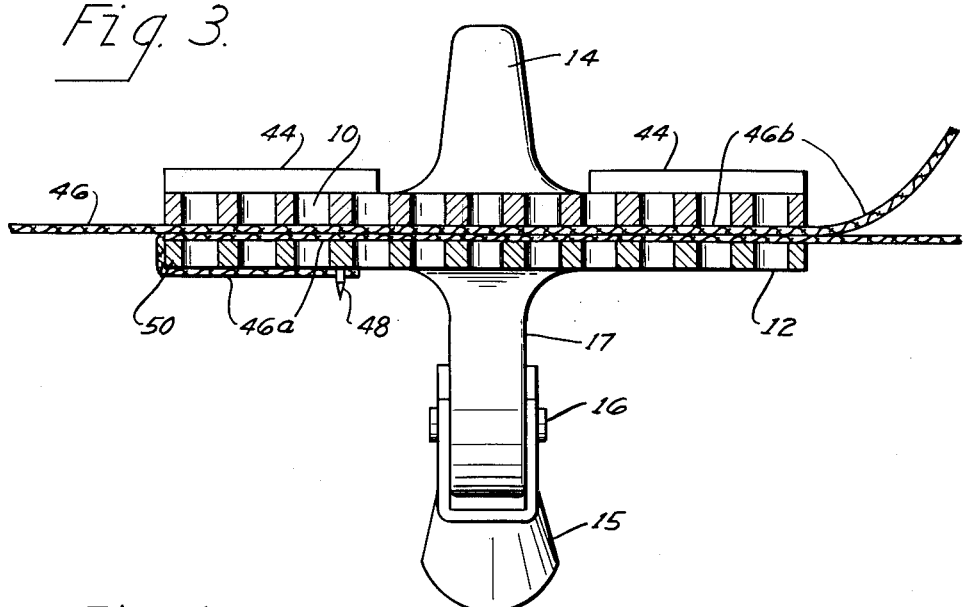
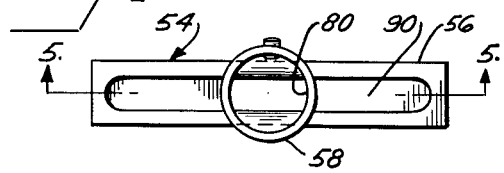
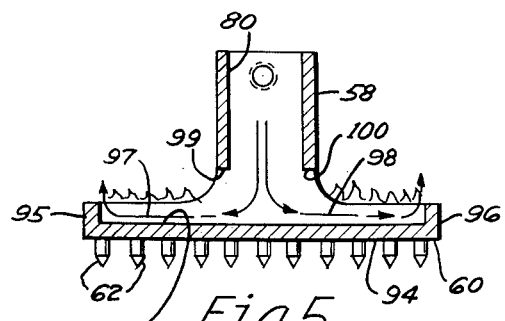
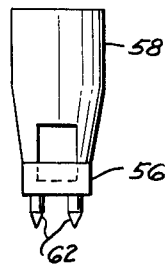
INVENTOR.
JOHN A. LINDSAY
BY
his ATTORNEY.

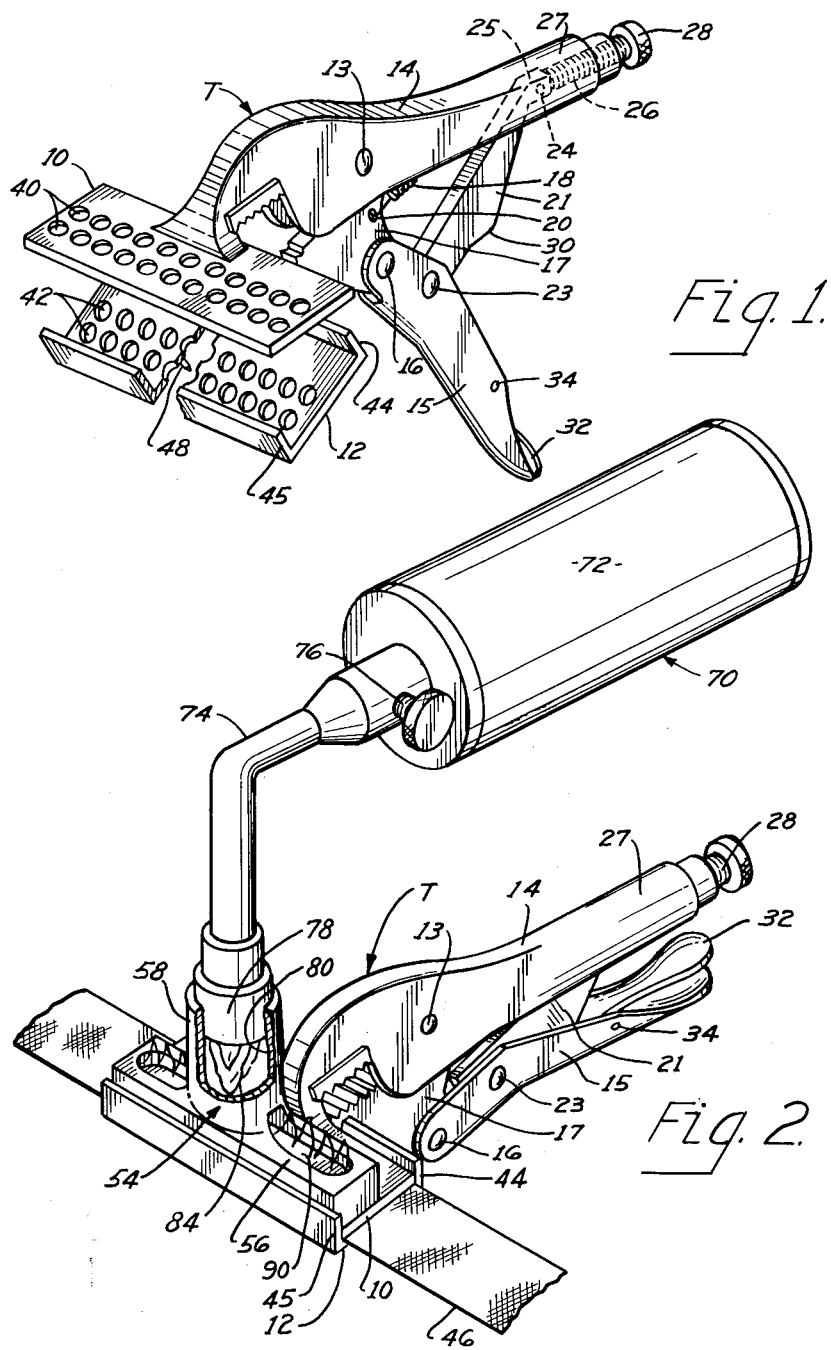

United States Patent Office 2,974,717
Patented Mar. 14, 1961

2,974,717
HEAT SEALING TOOL
John A. Lindsay, 1919 W. Pleasant Valley Road, Parma, Ohio
Filed June 21, 1960, Ser. No. 37,635
8 Claims. (Cl. 154—42)

This invention relates to a heat fusion bonding device and more particularly to a heat bonding hand tool adapted to bond the ends of synthetic tapes and the like.

In certain commercial ironing apparatus, large ironing rolls drive sheets and the like over heated platens for purposes of ironing the sheets. A number of synthetic, heat-fusible cloth tapes or bands are placed as belts around the rolls in parallel relation to prevent the sheets from wrapping around the rolls and forming undesirable overlapping folds therein during the ironing operation. These tapes or bands break frequently and must be spliced or replaced. The spliced, or new, joints must present smooth surfaces which will not make an impression on the sheet.

An object of the present invention is to provide an improved heat bonding hand tool for fusing portions of the overlapped ends of a synthetic tape into a smooth, secure joint.

A further object of the invention is to provide a heat bonding hand tool with means thereon facilitating the holding of the overlapped end portions of synthetic tape together in proper juxtaposition preparatory to, and during, subjection of the tape to heat fusing.

A further object is to provide a heat bonding hand tool of the aforedescribed type including an improved tape holder and an improved tool heating means cooperable with the holder.

Other objects and advantages of the invention will become apparent from the following description taken in conjunction with the drawings, wherein:

Fig. 1 is a perspective view of the tool of the invention, showing the jaw members thereof in open position, with a portion of the lower jaw member being broken away to show the tape retaining means thereof;

Fig. 2 is a perspective view of the tool shown in Fig. 1, showing the tape clamping jaws in clamped position with overlapped tape end portions disposed therebetween, and showing the heating member in operative position;

Fig. 3 is an enlarged front elevational view of the tool shown in Fig. 1 with the jaws in closed position with overlapped tape end portions disposed therebetween, the jaws and tape being shown in section for clearness in illustration;

Fig. 4 is a top plan view of the heating member shown in Fig. 2;

Fig. 5 is a vertical sectional view of the heating member shown in Fig. 4, and is taken on line 5—5 of Fig. 4; and Fig. 6 is a right end elevation of the heating member shown in Figs. 4 and 5.

Although the invention is shown and described herein as being used to connect or fuse together end portions of ironer roll tapes, it will be understood that it may be employed to connect end portions of any type of tape which may be heat fused, or to splice broken tapes of such nature.

Briefly, the foregoing objects are accomplished by the provision of a heat bonding tool comprising a holder and a heater. The holder is in the form of pliers having a pair of normally open, spaced, planular clamping jaws aligned with each other and movable flatwise toward and away from each other into tape clamping and releasing positions, respectively. The jaws are adapted to receive end portions of synthetic heat fusible tape, such as nylon tape, in overlapped relation therebetween when the jaws are in open position and to clamp the end portions in face to face juxtaposition when the jaws are in closed position.

Each of the jaws has a plurality of apertures therethrough, the apertures of one jaw being aligned with the apertures of the other jaw when the jaws are in clamping relation.

The structure thus far generally described is known in the art. In order to clamp the overlapped end portions between the jaws of such a structure, it is necessary to hold the plier handles in one hand and then, with the other hand, to place the end portions between the jaws in position for clamping and to hold them in this position as the jaws are closed. The operation is awkward to perform with only two hands. The difficulty is eliminated in accordance with the present invention by using self-locking pliers and providing means for detachably securing one of the end portions of the tape in proper position relative to one of the jaws preparatory to overlapping it with the other end portion, whereby, while the pliers are held in one hand, the other hand need only grasp the free end of the tape and move it to position between the jaws and hold it there during jaw closure by the one hand. For this purpose, a tape retaining means such, for example, as an outwardly extending retaining pin may be provided on the outer planular surface of one of the jaws.

In practice, while holding the pliers in one hand with the jaws in released position, one end portion of the tape is taken in the other hand and thereby hooked onto the retaining pin, and then passed between the open jaws. The tape is then tensioned lightly and its other end passed between the jaws in overlapping relation with the first end portion and so held by said other hand. While so held, the jaws are closed by the said one hand. The pliers are thus squeezed to self locking position, whereupon said other hand is free to, and does, apply the heating member to the clamped end portions.

Referring to the drawings, there is shown a heat bonding tool T of the invention. The tool comprises a holder in the form of self-locking pliers having a pair of co-acting, planular jaws 10 and 12 pivoted together at 13 for aligned movement flatwise toward and away from each other from clamping to releasing positions. The pliers have a handle 14 which extends rearwardly from the jaw 10, and a second handle 15 transversely pivoted at its inner end at 16 to a rearward extension 17 of the jaw 12. A coiled tension spring 18 is secured at its upper end to the handle 14 rearwardly of the pivot point 13 and the other end of the spring is secured in the aperture 20 on the rearward extension 17 of the jaw 12. The spring tends to resiliently pull the jaws 10 and 12 to open or released position in response to operation of the handles.

A fulcrum bar or lever 21 pivotally links the handles 14 and 15 together and is rotatably connected at its inner end to the handle 15 by a pivot 23. At its other end, the bar 21 is connected by a pivot 24 to a slide head 25, which is slidably telescoped within the bore 26 of a tubular outer end portion 27 of the handle 14. A bolt 28 is threaded into the outer end of the bore 26, as shown, the inner end of such bolt being adapted to contact the head 25 of the fulcrum lever or bar 21. The fulcrum lever 21 is provided with a fulcrum shoulder or abutment 30, which is contacted by the inner end portion of a releasing lever 32. The handle 15 is U-shaped in transverse section and the lever 32 is pivotally secured intermediate its end portions to the handle 15, interiorly thereof, at the point 34.

The action is such that when the jaws 10 and 12 are closed upon an object by pressing the plier-like handles 14 and 15 towards one another, the lever 21 passes dead center defined by the centerline drawn through the centers of pins 16, 23 and 24, thereby closing the jaws firmly. When the lever 21 passes beyond dead-center, the jaws are locked in position and grip the object without further closing pressure on the handles. Such locked position may be adjusted by the bolt 28 depending on the size of the object held between the jaws 10 and 12. The locked grip may be easily released by either pressing downward or pulling upward on the outer end of the lever 32, which upon being rocked either way will forcibly move the handle 15 slightly outwardly from the handle 14 to carry the inner end of the lever 21 back over the aforementioned center line to a partially released position such that the action of the spring 18, as well as the releasing pressure of the object tending to spread the jaws, function to open the wrench to fully released position. More detailed operational and structural details of the wrench T are set forth in U.S. Patent No. 2,514,130 of Harold T. Jones, issued July 4, 1950, and are not fully described herein since the specific details thereof form no part of the present invention.

The jaw 10, is preferably formed of a flat planular plate having a plurality of apertures 40 formed therein and uniformly distributed thereover. The jaw 12 is formed also of a flat, planular plate having a plurality of apertures 42 which are disposed in alignment with the apertures 40, respectively, when the jaws are in closed position.

Disposed on the inner and outer longitudinal edges of the plate 12 are upstanding guide flanges 44 and 45, respectively, which function as guide or alignment means to align the two end portions of the tape or band 46 in proper position for clamping between the jaws. As mentioned hereinabove, it is difficult to hold the pliers in one hand and then manipulate the two free end portions of the tape with the other hand. Accordingly, a tape retaining means is provided. This retaining means, in the form illustrated, is a simple pin 48.

In practice, with the jaws 10 and 12 in open or released position, an end portion 46a of the tape 46 is pierced or hooked onto the retaining pin 48 which is located on the undersurface of the jaw 12 and extends outwardly from the plane thereof. Next, the tape end portion 46a is laid around the end 50 of the jaw 12 and thence between the open jaws and flatwise on the upper surface of the jaw 12 between the guide flanges 44 and 45 thereon. While one end is held in this position merely by a slight pull exerted by the pliers held in one hand, the other end portion 46b of the tape is grasped in the other hand and positioned, under slight tension, between the open jaws and in face to face juxtaposition with the end portion 46a between the flanges 44 and 45. Thereupon, the jaws are moved to closed clamping position. With the tape end portions 46a and 46b so clamped between the jaws, the tape is then ready for the bonding operation.

As aforementioned, in a heat bonding tape of the type described herein, the end portions of the tape may be connected or joined by overlapping the end portions in parallel fashion, retaining such overlapped portions together in clamped relation by a suitable clamping means, and then applying heat of predetermined temperature to the overlapped joint. The heat causes the overlapped end portions to melt and fuse together to effect a joint substantially equal in strength to that of the tape itself.

Heat may be applied to such overlapped joint by any suitable means. The heating member of the present tool includes a heating member 54 having an elongated body portion 56 with an elongated tubular handle or neck portion 58 extending outwardly and upwardly at an abrupt angle from the body portion intermediate the ends thereof. Extending downwardly from the undersurface 60 of the body 56 is a plurality of pointed needles or pins 62, which are positioned for insertion, respectively, into the aligned apertures 40 and 42 when the jaws 10 and 12 are in clamped position. The pins are in firm heat conducting contact with the body portion 56. Thus, when the tape end portions are disposed between the jaws in overlapped, clamped position as aforedescribed, each of the pins will pierce the overlapped tape end portions as such pins are inserted respectively into the aligned apertures 40 and 42. If the pins have been heated to a preselected temperature, the heat from each pin melts the tape immediately adjacent the area pierced by the pin thereby fusing the two tape end portions together to effect a heat bonded joint.

The heating member 54 may be heated to such preselected temperature by any suitable heating means. For example, the member 54 may be heated over an open flame. However, with the latter method, it will be difficult, if not impossible, to maintain the heating member at substantially the desired temperature at all times whether the member is in use or not.

A feature of the present invention resides in the heating member 54, which may be associated with a conventional hand torch which may be adjusted to maintain the heating member at a constant, preselected temperature under all normal operating conditions. As an example, a conventional portable hand torch 70, shown in Fig. 2, and comprising a pressurized fuel or gas tank or reservoir 72, a fuel outlet line 74 having a fuel-metering control valve 76, and a nozzle 78 which is adapted to detachably telescope into the bore 80 of the neck portion 58 with a snug fit. In operation, pressurized fuel in the tank 72 flows past the fuel control valve 76, through the line 74, and thence out the end of the nozzle 78 to feed the gas into the body portion 56. The gas is directed down the bore 80 and into the mid-portion of the body portion 56. The body portion 56 has an elongated trough 90 extending lengthwise thereof and open for its full length at the face adjacent the neck portion 58. The trough is closed at its ends. The gas enters the midportion of the trough and flows outwardly endwise thereof to its ends, and thence is directed upwardly away from the lower face 94 of the body portion by the trough end walls 95 and 96, respectively, as shown by the arrows 97 and 98 in Fig. 5.

The nozzle 78 and neck portion 58 are imperfroate so that combustion cannot occur therein, but is constrained to occur in the trough 90.

Passageways or notches 99 and 100 are provided in the neck portion 58 at or adjacent its juncture with the trough to permit the induction of air for sustaining combustion in the trough. The notches 99 and 100 extend from the open upper side of the trough 90 a short distance upwardly therebeyond and are aligned circumferentially of the neck portion 58 with the trough, with one notch at each side of the neck portion.

With this construction, the body 56 is heated evenly throughout its length such that all of the pins 62 are heated to the same temperature by the combustion of the gas, the temperature of such jet being controlled by the valve 76, and the flame leaves the head in a rearward direction so as not to impinge on the tape.

Only enough gas is supplied to cause the flame to extend very slightly out of the open side of the trough near the ends. Air is excluded from the nozzle 78 and from the neck portion, except adjacent the trough, so that, though the entire trough is filled with burning gas, the gas does not burn in the nozzle and concentrate the heat on the part of the head aligned with the nozzle.

When the heated pins 62 pierce the overlapped tape end portions which are disposed between the clamped jaws as aforedescribed, the areas around the aligned apertures formed thereby in the tape are heated and fused together to form a smooth, secure joint.

Although the means for moving the jaws 10 and 12 to open and closed positions is shown and described herein as the pliers or wrench tool T, it will be understood that other suitable means may be used to open and close the jaws.

Having thus described my invention, I claim:

1. A heat sealing tool for fusibly bonding overlapping end portions of heat-fusible thermoplastic tape comprising a pair of parallel spaced planular clamping jaw members positioned for aligned movement flatwise toward and away from each other from releasing to clamping positions and arranged for receiving, in overlapping face-to-face relation therebetween, the tape end portions to be joined when the jaws are in clamping position, clamping means for moving said jaw members toward and away from each other into and out of clamping position, each of said jaw members having a plurality of apertures, the apertures of one jaw member being aligned with the apertures of the other jaw member when the jaw members are in said clamping position, tape retaining means on one of said jaw members and adapted for connection detachably to one end portion of the tape for retaining the connected tape end portion in fixed position relative to said one of the jaw members so that the tape can be grasped in spaced relation to said tape end portion and manually tensioned endwise and laid flatwise on the clamping face of said one jaw member when the jaw members are in released position and retained thereon during movement of the jaw members to clamping position, a heating member including an elongated body having a plurality of parallel depending heat conducting pins insertable concurrently through the aligned apertures, respectively, of the jaw members in piercing relation to the tape end portions clamped between the jaw members, and heating means for heating said pins to a predetermined temperature required for heat fusing the tape together at the edges of the apertures formed by the pins in the overlapped end portions when the heated pins are passed through said aligned apertures.

2. The tool according to claim 1 wherein said tape retaining means is a retaining pin on said one jaw member and extends outwardly therefrom and is adapted to pierce the associated end portion of the tape.

3. The tool according to claim 2 wherein the pin extends outwardly from that face of said one jaw member which is outwardly from said clamping face.

4. The tool according to claim 1 wherein said one jaw member has guide flanges at its lateral margins for constraining the tape end portions from lateral displacement from said aligned, parallel, overlapped position on said one jaw member preparatory to, and during, disposal of the jaw members in clamping position.

5. The tool according to claim 1 wherein said heating member includes an elongated hollow neck adapted to be secured to a gas jet injecting device in coaxial relation with the jet, and said elongated body is of heat conducting material and has a trough extending endwise of the body and opening through one face, said pins extending from the other face, and said neck extending from said one face at an abrupt angle thereto for directing the jet into the trough near the longitudinal midportion of the trough, said trough having end walls for deflecting gaseous mixtures passing from the neck along the trough away from said other face, and having a flame directed down the hollow interior of the neck and against the elongated body of the heating member to heat such body and the pins thereon.

6. The tool according to claim 5 wherein passages for induction of air are provided in said neck at the end adjacent the trough.

7. The tool according to claim 6 wherein said passages are a pair of notches extending from the open side of the trough and aligned circumferentially of the neck with the trough, one at each side of the neck.

8. The tool of claim 1 wherein said clamping means is a pair of pliers, and the clamping jaw members are disposed on the article gripping ends of the pliers, respectively, and said pliers have self-locking means operable to releasably lock the jaw members in said clamped position.

No references cited.